United States Patent
Segawa et al.

(10) Patent No.: US 7,705,948 B2
(45) Date of Patent: Apr. 27, 2010

(54) LIQUID CRYSTAL DISPLAY DEVICE

(75) Inventors: Yasuo Segawa, Kitagata-cho (JP);
Masaaki Aota, Ogaki (JP); Shinji Ichikawa, Hashima (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 298 days.

(21) Appl. No.: 11/907,479

(22) Filed: Oct. 12, 2007

(65) Prior Publication Data

US 2008/0088785 A1    Apr. 17, 2008

(30) Foreign Application Priority Data

Oct. 13, 2006    (JP)    ............... 2006-280583

(51) Int. Cl.
*G02F 1/1345*    (2006.01)
(52) U.S. Cl. ...................................... 349/141
(58) Field of Classification Search .................. 349/141
See application file for complete search history.

(56) References Cited

U.S. PATENT DOCUMENTS

| | | | |
|---|---|---|---|
| 6,456,351 B1 | 9/2002 | Kim et al. | |
| 6,469,765 B1 | 10/2002 | Matsuyama et al. | |
| 6,600,542 B2 | 7/2003 | Kim et al. | |
| 6,603,526 B2 | 8/2003 | Kim et al. | |
| 6,646,707 B2 | 11/2003 | Noh et al. | |
| 6,816,222 B2 | 11/2004 | Ono et al. | |
| 7,136,130 B2 | 11/2006 | Ono et al. | |
| 7,295,268 B2 | 11/2007 | Ono et al. | |
| 7,345,728 B2 | 3/2008 | Lee et al. | |

2008/0074602 A1    3/2008    Arai et al.

FOREIGN PATENT DOCUMENTS

| | | | |
|---|---|---|---|
| JP | A-2000-029072 | | 1/2000 |
| JP | A-2000-356786 | | 12/2000 |
| JP | A-2002-182230 | | 6/2002 |
| JP | A 2003-280017 | | 10/2003 |
| JP | A 2005-107535 | | 4/2005 |
| JP | A-2008/83386 | | 4/2008 |
| KR | A 2002-0063498 | | 8/2002 |
| KR | A 2002-0085237 | | 11/2002 |
| KR | A 2003-0053562 | | 7/2003 |
| KR | A 2005-0030462 | | 3/2005 |
| KR | 10-2006-0007520 | * | 1/2006 |
| KR | A 2006-0007520 | | 1/2006 |
| KR | 10-2006-0071677 | * | 6/2006 |
| KR | A 2006-0071677 | | 6/2006 |

* cited by examiner

*Primary Examiner*—Uyen-Chau N Le
*Assistant Examiner*—Hoang Tran
(74) *Attorney, Agent, or Firm*—Oliff & Berridge, PLC (57) ABSTRACT

A liquid crystal display device having an upper electrode layer and a lower electrode layer formed on an identical substrate via an insulating layer includes slits formed on the upper electrode layer for applying voltage between the upper electrode layer and the lower electrode layer and driving liquid crystal molecules. Edge portions of the slits each include a first curved portion the tangential direction of which at the edge portions with respect to the rubbing direction falls within a range from 0° to +90° and a second curved portion the tangential direction of which at the edge portions with respect to the rubbing direction falls within the range from 0° to −90°. The direction toward an acute angle subtended by the long sides of the slits with respect to the rubbing direction is the positive direction. The second curved portion is smaller than the first curved portion.

15 Claims, 10 Drawing Sheets

RUBBING DIRECTION

LIQUID CRYSTAL DISPLAY DEVICE

CROSS-REFERENCE TO RELATED APPLICATION

This application claims priority from Japanese Patent Application No. 2006-280583 filed in the Japanese Patent Office on Oct. 13, 2006, the disclosure of which is incorporated herein by reference in its entirety.

BACKGROUND

1. Technical Field

Embodiments of the present invention relate to a liquid crystal display device and, more specifically, to a liquid crystal display device in which one of an upper electrode layer and a lower electrode layer formed on an identical substrate via an insulating layer is assigned as a common electrode layer, and the other one of the upper electrode and lower electrode is assigned as a pixel electrode layer, the upper electrode layer is formed with slits, through which voltage is applied between the upper electrode layer and the lower electrode layer for driving liquid crystal molecules.

2. Related Art

In the related art, TN (Twisted Nematic) system has been widely used as a display system of the liquid crystal display device. However, this system has a limit in angle of visibility because of the display principle thereof. As a known method for solving this limitation, there is a lateral electric field system configured in such a manner that a pixel electrode and a common electrode are formed on an identical substrate, and voltage is applied between the pixel electrode and the common electrode to generate an electric field which is substantially parallel to the substrate to drive liquid crystal molecules within a plane which extends in parallel to the substrate plane.

IPS (In plane Switching) system and FFS (Fringe Field Switching) system are known as the lateral electric field system. In the IPS system, a comb-teeth-shaped (or comb-tooth-shaped) pixel electrode and a comb-teeth-shaped (or comb-tooth-shaped) common electrode are arranged in combination. In FFS system, one of the upper electrode layer and the lower electrode layer formed via the insulating layer is assigned as the common electrode and the other one of those is assigned as the pixel electrode, and slits or the like are formed on the upper electrode layer as openings for allowing passage of the electric field.

The openings for allowing the passage of the electric field to the upper electrode layer are formed by etching an electrode thin film. However, when forming the openings into an elongated groove shape, the edge portions at the ends of the long side are formed into a round shape or an arcuate shape in many cases due to the limit of the formation process (exposure, etching). The electric field passing from the lower electrode layer through the openings toward the upper electrode layer flows along the pattern of the openings, and hence the electric field is rounded along the pattern of the arcuate shape at the edge portions. Consequently, for example, when the initial alignment of the liquid crystal molecules is oriented substantially parallel to the long sides of the openings through a rubbing process or the like and the electric field is applied between the upper electrode layer and the lower electrode layer to drive the liquid crystal molecules, the liquid crystal molecules in the areas within the linear portions of long sides of the openings rotate from the initial alignment in the direction vertical to the long sides, while the liquid crystal molecules in the edge portions of the openings rotate from the initial alignment in the direction vertical to the arcuate shape.

When the liquid crystal molecules rotate from the initial alignment along the arcuate shape of the edge portions, such phenomenon that the direction of rotation of the liquid crystal molecules is inverted occurs. For example, it is assumed that the arcuate shape of the edge portions is a part of a circle and the rubbing direction is substantially parallel to the long sides of the openings, and that the direction of the long sides of the openings is X-axis, the direction vertical to the long sides is Y-axis. Then, when the arcuate shape at the edge portions has a shape corresponding to the first quadrant of a circle, the liquid crystal molecules rotate counterclockwise from the X-axis direction and are oriented in the direction vertical to the arcuate shape. In contrast, when the arcuate shape of the edge portions has a shape corresponding to the fourth quadrant of the circle, the liquid crystal molecules rotate clockwise from the X-axis direction and are oriented in the direction vertical to the arcuate shape. In the same manner, when the arcuate shape of the edge portions has a shape corresponding to the second quadrant of the circle, the liquid crystal molecules rotate clockwise from the X-axis direction and are oriented in the direction vertical to the arcuate shape, and when the arcuate shape of the edge portions has a shape corresponding to the third quadrant of the circle, the liquid crystal molecules rotate counterclockwise from the X-axis direction and are oriented in the direction vertical to the arcuate shape.

In this manner, when the electric field is applied, the direction of rotation of the liquid crystal molecules at the edge portions varies depending on the position. The phenomenon that the direction of rotation varies with the position is referred to as "disclination". At the boundaries between portions demonstrating different directions of rotation, the liquid crystal molecules rotate in undesired directions, or even cannot rotate. Therefore, the coefficient of transmission is lowered, and hence the boundaries are visually recognized. These boundaries are referred to as "disclination lines" or "disclination defects", and may also be referred simply as "disclination".

JP-A-2003-280017 points out a problem in the IPS system in which voltage is applied to the comb-teeth-shaped pixel electrodes and the common electrodes formed on the identical substrate to generate the electric field which is substantially parallel to the substrate plane and drive the liquid crystal molecules in a plane parallel to the substrate plane such that radial electric fields generated in the vicinity of distal end portions or root portions of the comb-teeth-shaped electrodes generate areas in which the liquid crystal molecules rotate in the opposite direction from the normal rotation (reverse domain), which generates the disclination defects (disclination) at the boundaries with respect to the areas of normal rotation. Japanese Unexamined Patent Application Publication No. 2003-280017 discloses that when a high-field is generated by superimposing the pixel electrodes and the common electrodes, the normal rotation of the liquid crystal molecules is induced without fixing the same in the direction of the initial alignment by establishing the relation between the direction of a high-field θSE and the direction of initial alignment of the liquid crystal θLC to be θLC<θSE≦θLC+π/2, where the direction of rotation of the liquid crystal is the positive direction (clockwise rotation) with reference to the direction of the scanning wiring (gate wiring), so that occurrence of reverse domain and disclination are restrained.

According to JP-A-2005-107535, in the case of a configuration in which a black matrix on the upper substrate and the edge portions of the pixel electrodes of the lower substrate are overlapped with each other by a predetermined area and liquid crystal is interposed between these substrates, the twisted angle of the liquid crystal molecules is changed gradually to about 90° and arranged in the vertical direction as it approaches from the ends of the edge portions to the center of the pixel electrodes due to the electrical field interference between the black matrix and the pixel electrode. However, since the edge portions have a curved shape due to the limitation in exposure process, a trace of rubbing, that is, the disclination (disclination lines) is generated in the white tone. JP-A-2005-107535 discloses a structure in which the edge portions of the pixel electrodes have a linear shape, and are inclined with respect to the pixel electrodes at an angle of 9 to 12°, whereby a restoration force of the liquid crystal and a deflecting force of the liquid crystal are increased in the edge portions of the pixel electrodes.

Since many of the edge portions in which the disclination may occur are arranged at the end of light transmitting areas, the disclination in the light transmitting areas may be avoided by the provision of the black matrix or the like. However, this results in lowering of the aperture ratio of pixel.

The disclination generated when the pixel electrodes and the common electrodes are superimposed in the EPS system is addressed in JP-A-2003-280017, and the disclination between the black matrix on the upper substrate and the edge portions of the pixel electrodes on the lower substrate is addressed in JP-A-2005-107535. In both of them, the upper electrode layer and the lower electrode layer are arranged on the identical substrate with the intermediary of the insulating layer, and the disclination when the electrode layer is formed with openings for allowing the passage of the electric field to the upper electrode layer is not addressed.

SUMMARY

An advantage of some aspects of the invention is to provide a liquid crystal display device in which disclination is restrained.

A liquid crystal display device according to an aspect of the invention is a liquid crystal display device having an upper electrode layer and a lower electrode layer formed on an identical (or a same) substrate via an insulating layer including slits formed on the upper electrode layer for applying voltage between the upper electrode layer and the lower electrode layer and driving liquid crystal molecules, wherein edge portions of the slits each include a first curved portion the tangential direction of which at the edge portions with respect to the rubbing direction falls within a range from 0° to +90° and a second curved portion the tangential direction of which at the edge portions with respect to the rubbing direction falls within the range from 0° to −90°, where the direction toward an acute angle subtended by the long sides of the slits with respect to the rubbing direction is the positive direction, and wherein the second curved portion is smaller than the first curved portion.

A liquid crystal display device according to another aspect of the invention is a liquid crystal display device having an upper electrode layer and a lower electrode layer formed on an identical substrate via an insulating layer including openings connected to each other on one side thereof in a comb-teeth shape on the upper electrode layer for applying voltage between the upper electrode layer and the lower electrode layer and driving liquid crystal molecules, wherein edge portions of the comb-teeth each include a first curved portion the tangential direction of which at the edge portion of the comb-tooth with respect to the rubbing direction falls within a range from 0° to +90° and a second curved portion the tangential direction of which at the edge portions of the comb-teeth with respect to the rubbing direction falls within a range from 0° to −90°, where the direction toward an acute angle subtended by the long sides of the comb-teeth with respect to the rubbing direction is the positive direction, and wherein the second curved portion is smaller than the first curved portion.

Preferably, the edge portion further includes an inclined end line having an angle of inclination between α and +90° with respect to the rubbing direction, where α is an acute angle subtended by the long sides of the slits with respect to the rubbing direction and the direction toward the acute angle is the positive direction. Preferably, the edge portion of the comb-tooth further includes the inclined end line having an angle of inclination between α and +90° with respect to the rubbing direction, where α is the acute angle subtended by the long sides of the comb-teeth with respect to the rubbing direction and the direction toward the acute angle α is the positive direction.

Preferably, the edge portion of the slit further includes a projection at the distal end thereof. Preferably, the edge portion of the comb-tooth further includes a projection at the distal end thereof.

Preferably, the rubbing direction with respect to directions of axes of the rectangular shape of the pixel orthogonal to each other is at an angle of 45°.

Preferably, the edge portion of the comb-tooth is the distal end portion or the proximal end portion of the comb-tooth. Preferably, the upper electrode is a pixel electrode. Preferably, the upper electrode is a common electrode.

In this configuration, in the liquid crystal display device in which openings are formed on the upper electrode layer from among the upper electrode layer and the lower electrode layer formed on the identical substrate via the insulating layer for allowing passage of the electric field, and voltage is applied between the upper electrode layer and the lower electric layer to drive the liquid crystal molecules, the edge portions of the openings each defined by the first curved portion the tangential direction of which at the edge portion with respect to the rubbing direction falls within the range from 0° to +90° and a second curved portion the tangential direction of which at the edge portions with respect to the rubbing direction falls within a range from 0° to −90°, where the direction toward the acute angle subtended by the long sides of the openings with respect to the rubbing direction is the positive direction, and the second curved portion is formed to be smaller than the first curved portion. It was found by the inventors of this application that the areas where the disclination occurs are the edge portions of the openings the tangential direction of which at the edge portion with respect to the rubbing direction falls within the range from 0° to −90° from the experience or by the analysis of the electric field. Therefore, the areas where the disclination occurs may be restrained by downsizing the edge portions of the openings the tangential direction of which at the edge portions with respect to the rubbing direction falls within the range from 0° to −90°.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring now to the drawings, embodiments of the invention will be described in detail. The following description will be given about a FFS system liquid crystal display device configured to display with four colors: red (R), green (G), blue (B), and cyan (C). However, an exemplary embodiment of the invention includes a liquid crystal display device configured with three colors of R, G, and B, and also a liquid crystal display device configured simply with black and white as a matter of course. The following description will be given about the configuration of the FFS system in which a lower electrode layer is used as a pixel electrode and an upper electrode layer is used as a common electrode. However, the inverted configuration, that is, a configuration in which the lower electrode layer is used as the common electrode and the upper electrode layer is used as the pixel electrode is also applicable. In the FFS system shown below, the common electrodes are arranged separately for the respective pixels. However, a configuration in which the common electrode is not separated for the respective pixels may also be applicable.

Figure 1:
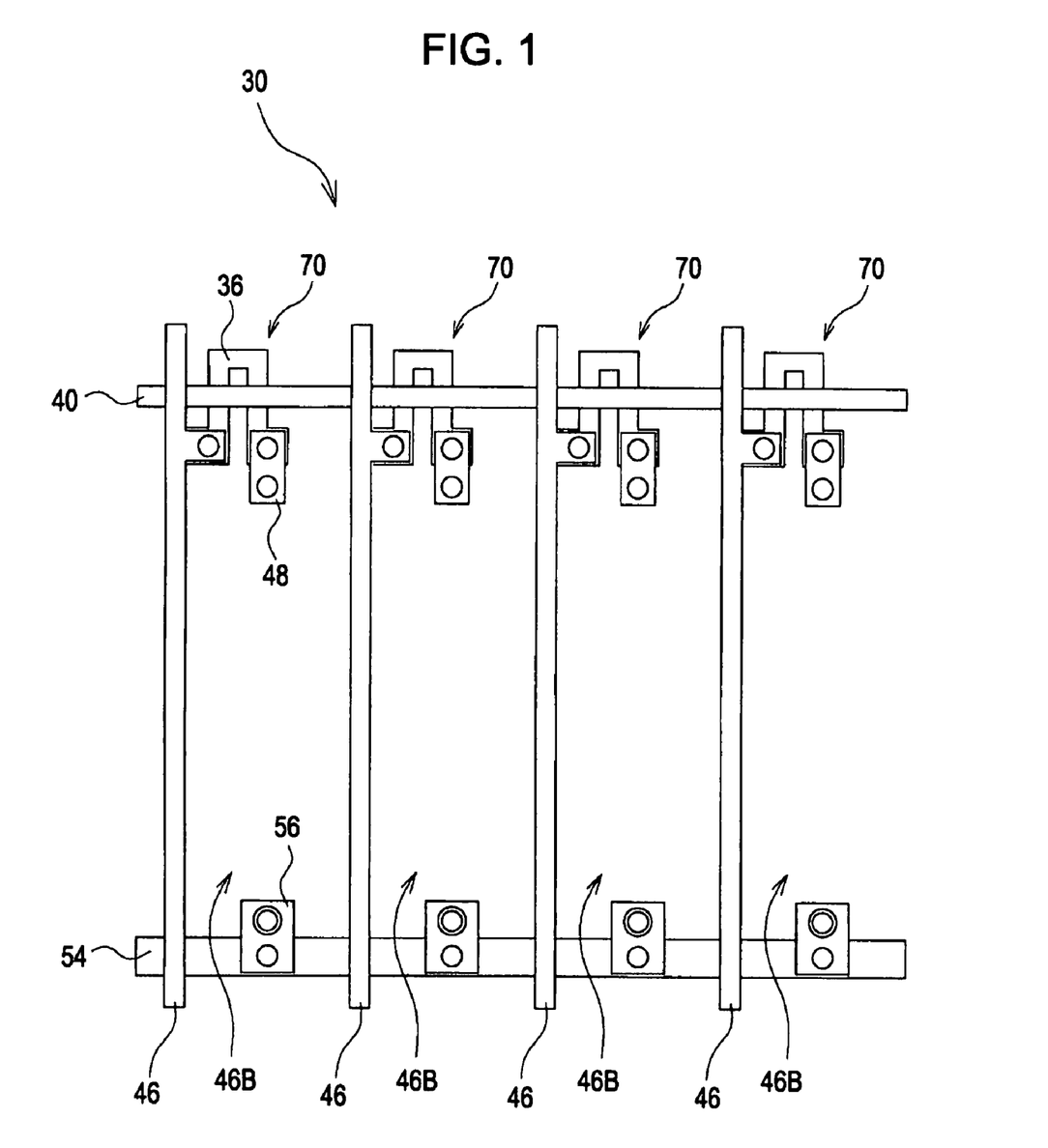
FIG. 1 illustrates a plan configuration of an FFS system liquid crystal display device according to an embodiment of the invention immediately before forming pixel electrodes.
Figure 2:
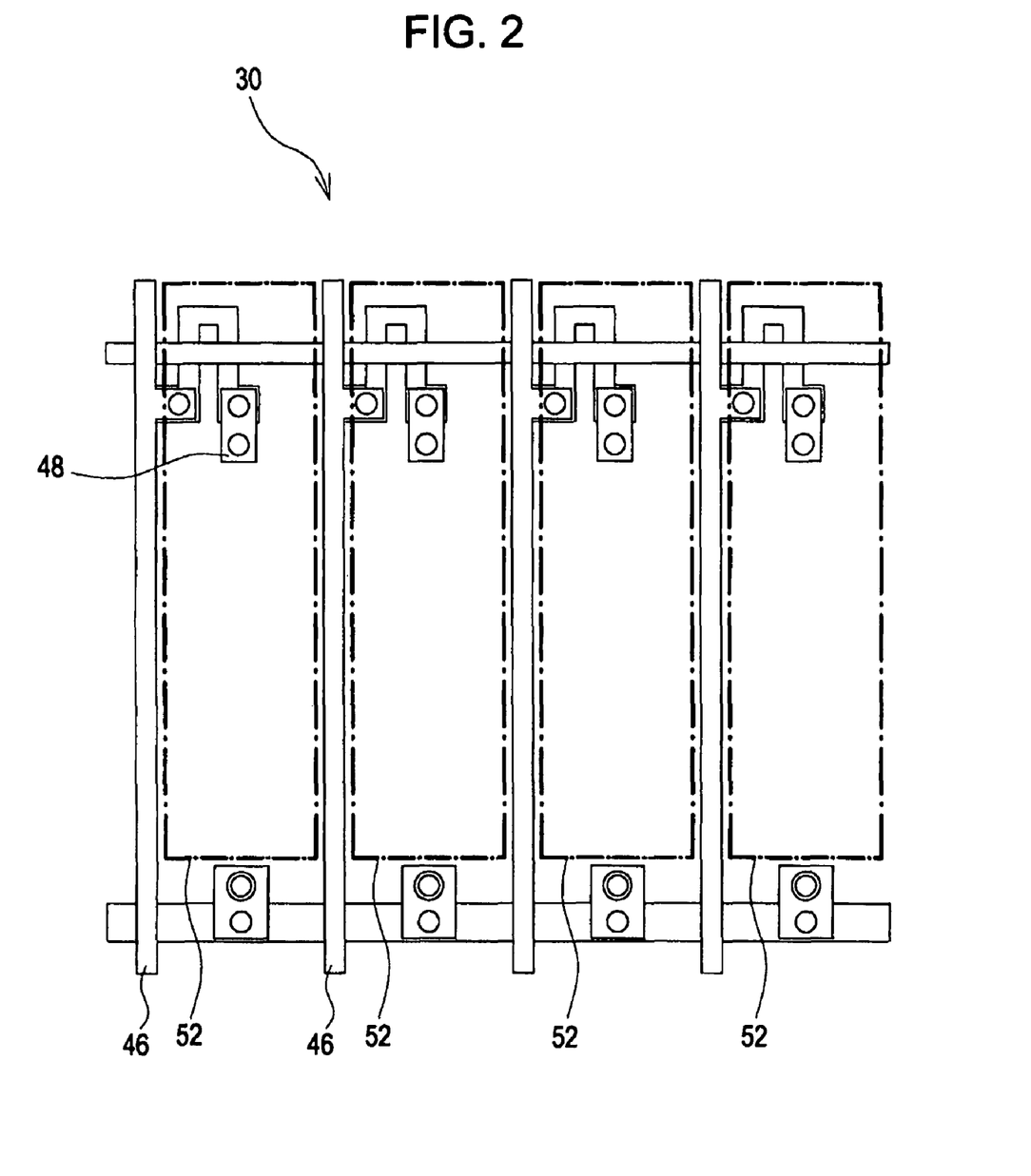
FIG. 2 illustrates the plan configuration shown in FIG. 1, but after the formation of pixel electrodes.
Figure 3:
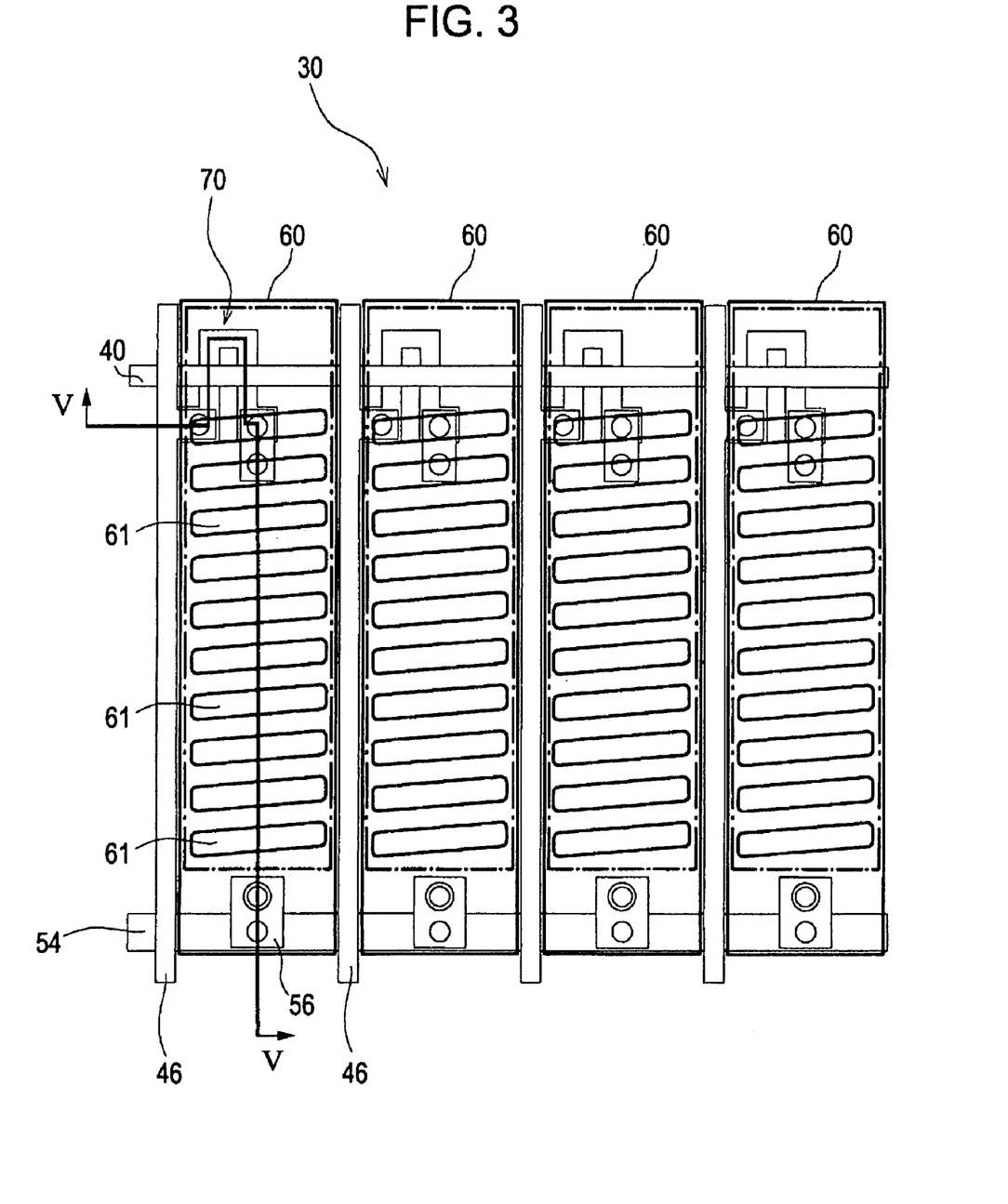
FIG. 3 illustrates the plan configuration shown in FIG. 2, but after the formation of common electrodes.
Figure 4:
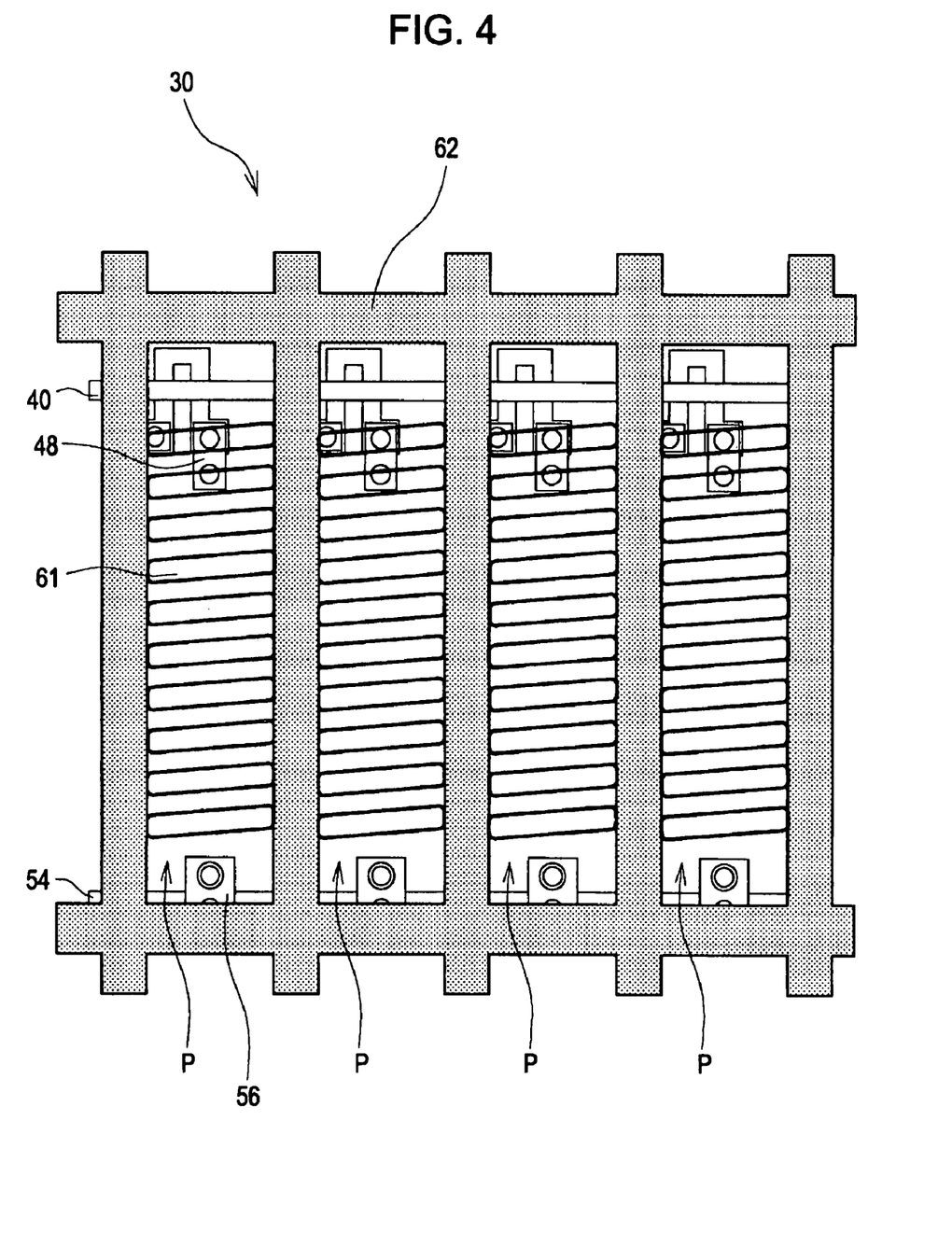
FIG. 4 illustrates an arrangement of a black matrix provided in addition to the configuration in FIG. 3.
Figure 5:
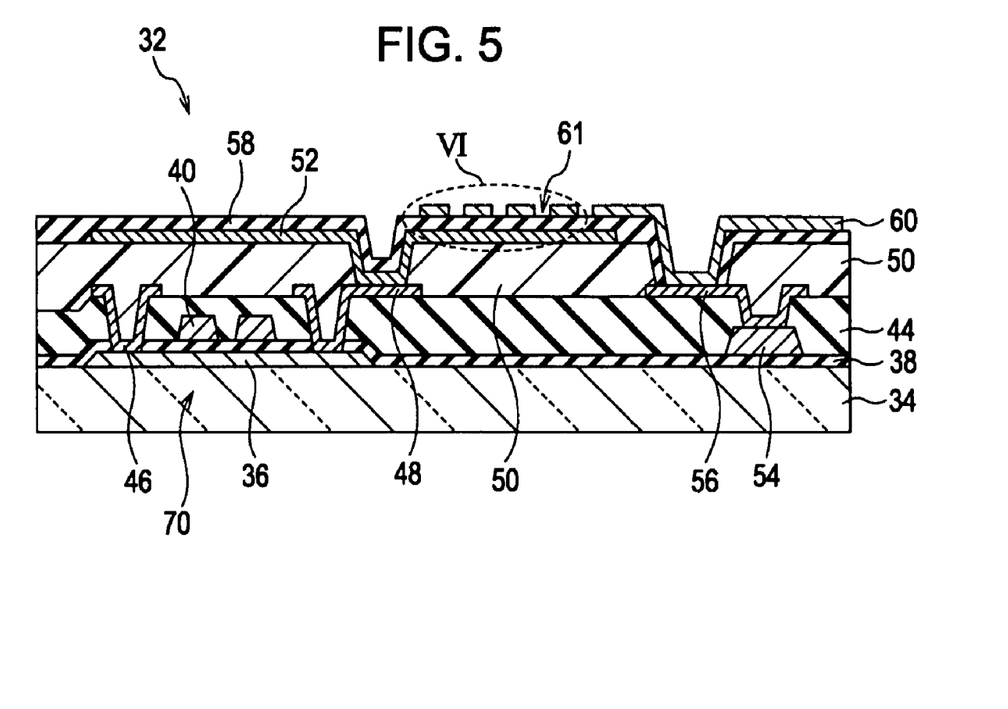
FIG. 5 is a cross-sectional view of the FFS system liquid crystal display device according to the embodiment shown in FIG. 1.

FIG. 1 to FIG. 4 each illustrate a plan configuration of four pixels of a display area when display is achieved by four colors of R, G, B, and C in the FFS system liquid crystal display device 30. FIG. 5 is a cross-sectional view thereof. FIG. 1 illustrates a plan configuration immediately before forming pixel electrodes. FIG. 2 illustrates the plan configuration shown in FIG. 1, but after the formation of pixel electrodes. FIG. 3 illustrates the plan configuration shown in FIG. 2, but after the formation of common electrodes. In FIG. 3, pixel electrodes 52 are illustrated by thick chain lines, and common electrodes 60 are illustrated by thick solid lines. An alignment layer is formed thereon, so that an array substrate is completed. FIG. 4 illustrates an arrangement of a black matrix provided on an opposed substrate which opposes the array substrate in addition to the configuration in FIG. 3. FIG. 5 is a cross-sectional view taken along the line V-V in FIG. 3 in which the direction of thickness is illustrated in an exaggerated manner.

Referring to FIG. 1 to FIG. 3, the plan configuration of the liquid crystal display device 30 will be described first and, subsequently, referring to the cross-sectional view in FIG. 5, the structure will be described.

As shown in FIG. 1, in the liquid crystal display device 30, a plurality of drain wirings 46 respectively extend linearly (extend in the vertical direction in the example shown in FIG. 1), and a plurality of gate wirings 40 are respectively arranged in the direction intersecting with the direction of extension of the drain wirings 46 (in this case, the direction orthogonal thereto, and the lateral direction in the example shown in FIG. 1). Individual areas partitioned by the plurality of drain wirings 46 and the plurality of gate wirings 40 are pixel arrangement areas 46B. The four pixel arrangement areas 46B are illustrated corresponding to the four color configuration of R, G, B, and C in FIG. 1. When a color display unit is counted as one pixel, the pixel arrangement area 46B in this specification corresponds to a subpixel. Common electrode wirings 54 are also arranged in the direction intersecting in the direction of extension of the drain wirings 46 (in the lateral direction in the example shown in FIG. 1). The positions where the common electrode wirings 54 are arranged are the opposite sides of the gate wirings 40 with the intermediary of the respective pixel arrangement areas 46B.

Here, the respective drain wirings 46 shown here are arranged at regular pitches as a whole. The width of the respective drain wirings 46 (the dimension in the direction of arrangement of the drain wirings 46) is the same. In the drawings, the drain wirings 46 are illustrated to be extended straight. However, they may locally have a meandering portion and extend in this direction of extension as a whole. The arrangement of the pixel may be of a stripe pattern, a delta pattern, or a mosaic pattern.

Pixel TFTs 70 are arranged respectively in the pixel arrangement areas 46B partitioned by the drain wirings 46, the gate wirings 40, and the common electrode wirings 54. In the example shown in FIG. 1, a semiconductor layer 36 extends substantially in a U-shape in each pixel TFT 70 (in the drawings, the substantially U-shape is illustrated in an inverted state), and the gate wiring 40 extends across two arm portions of the substantially U-shape in the direction of arrangement of the drain wirings 46. In this configuration, source electrodes 48 of the pixel TFTs 70 are arranged on the same side as the drain electrodes to be connected to the drain wirings 46 with respect to the gate wiring 40. Accordingly, the pixel TFT 70 has a configuration in which the gate wiring 40 intersects with the semiconductor layer 36 twice between the source and the drain. In other words, a configuration in which two gate electrodes are provided between the source and the drain of the semiconductor layer 36.

In this manner, the drain of the pixel TFT 70 is connected to the closest drain wiring 46 and, as shown in FIG. 2, the source is connected to the pixel electrode 52 via the source electrode 48. The common electrode wiring 54 is provided with common electrode relay electrodes 56 and as shown in FIG. 3, is connected to the common electrodes 60 via the common electrode relay electrodes 56.

FIG. 2 illustrates the state after formation of the pixel electrodes 52. The pixel electrodes 52 are provided for the respective pixels, and are plate-shaped electrodes to be connected to the sources of the pixel TFTs 70 of the corresponding pixels.

FIG. 3 illustrates the state after formation of the common electrodes 60. In the example shown in FIG. 3, the common electrodes 60 are provided for the respective pixels. However, they may be provided so as to extend across the pixels depending on the circumstances. The common electrodes 60 are formed by providing slits 61 as openings on the transparent electrode film layers. The slits 61 have a function to allow passage of an electric field (see FIG. 6) and generate a lateral electric field parallel to the substrate surface when voltage is applied between the pixel electrode 52 and the common electrode.

The alignment layer is arranged on the common electrodes 60, which is rubbed as an alignment process. The rubbing direction may be the direction parallel to the gate wiring 40, for example, in FIG. 3. The slits 61 of the common electrodes 60 are formed in such a manner that the direction of extension of the long sides thereof is slightly inclined with respect to the rubbing direction. For example, they may be formed so as to be inclined by about 5° in angle with respect to the rubbing direction. An array substrate (see FIG. 5) is completed by forming the alignment film on the common electrodes 60 and performing the rubbing process.

A black matrix 62 shown in FIG. 4 is formed of a laminated layer, an opaque resin film or the like of, for example, chrome and chrome oxide, and is provided on the opposed substrate. In addition to a black matrix, a color filter and an orientation film are formed, and liquid crystal is sandwiched with an array substrate. The black matrix 62 is provided so as to extend between the adjacent pixel electrodes 52 described in conjunction with FIG. 2, and is provided corresponding to the respective pixel arrangement areas 46B described in conjunction with FIG. 1 with openings P. The openings P may be formed so as to be partly overlapped with the edge portions, that is, the short sides, of the slits 61. In other words, the black matrix 62 may be provided so as to be wider than the width of the respective drain wirings 46 described in conjunction with FIG. 1, and maybe overlapped with, and extended along, the drain wirings 46 (in FIG. 4, the respective drain wirings are hidden and are not shown). Here, the openings P define the contours of the pixels. The drain wirings 46, the gate wirings 40, the source electrodes 48, the common electrode wirings 54, and the common electrode relay electrodes 56 have the light-shielding property like the black matrix, and hence the openings of the pixels may be defined thereby.

Figure 6:
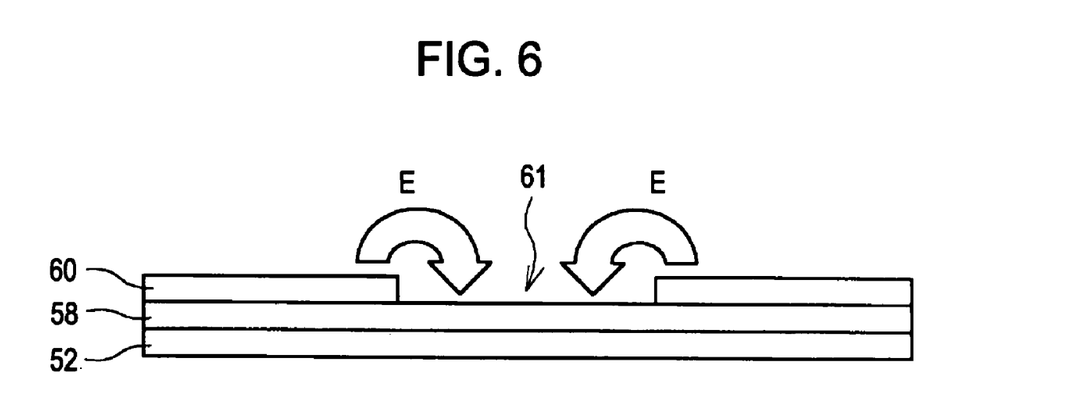
FIG. 6 is an explanatory drawing schematically showing a state of an electric field E applied between the common electrode and the pixel electrode.

Referring now to a cross-sectional drawing in FIG. 5, the structure of the array substrate 32 in the FFS system liquid crystal display device will be described. FIG. 5 is a cross-sectional drawing taken along the line V-V in FIG. 3, which illustrates the components for one pixel. FIG. 6 schematically shows portion VI of FIG. 5.

The array substrate 32 includes a transmissive substrate 34, the semiconductor layer 36, a gate insulating film 38, the gate wiring 40, an inter-layer insulating film 44, the drain wiring 46, the source electrode 48, a flattening film 50, the pixel electrode 52, the common electrode wiring 54, the common electrode relay electrode 56, an FFS insulating film 58, and the common electrode 60.

The transmissive substrate 34 is formed, for example, of glass. The semiconductor layer 36 is formed, for example, of polysilicon, and is arranged on the transmissive substrate 34. The gate insulating film 38 is formed, for example, of silicon oxide or silicon nitride and is arranged on the transmissive substrate 34 so as to cover the semiconductor layer 36. The gate wiring 40 is formed, for example, of metal such as Mo or Al, is arranged on the gate insulating film 38 so as to oppose the semiconductor layer 36, and constitutes the pixel TFT 70 in cooperation with the gate insulating film 38 and the semiconductor layer 36. The gate wiring 40 is also referred to as a scanning line.

The inter-layer insulating film 44 is formed, for example, of silicon oxide or silicon nitride, and is arranged on the gate insulating film 38 so as to cover the gate wiring 40. Contact holes are provided so as to penetrate through the inter-layer insulating film 44 and the gate insulating film 38, and the contact holes are provided at a position on the semiconductor layer 36 corresponding to the source and the drain of the pixel TFT 70. The drain wiring 46 is formed, for example, of metal such as Mo, Al, or Ti, is arranged on the inter-layer insulating film 44, and is connected to the semiconductor layer 36 via one of the contact holes. The drain wiring is also referred to as a signal line. The source electrode 48 is formed, for example, of the same material as the drain wiring 46, is arranged on inter-layer insulating film 44 and is connected to the semiconductor layer 36 via the other contact hole.

In this embodiment, a portion of the semiconductor layer 36 to which the drain wiring 46 is connected is used as a drain of the pixel TFT 70 and a portion thereof to which the pixel electrode 52 is connected via the source electrode 48 is used as a source of the pixel TFT 70. However, the appellations of drain and source may be vise versa.

The flattening film 50 is formed, for example, of an insulative transparent resin such as acryl, and is arranged on the inter-layer insulating film 44 so as to cover the drain wiring 46 and the source electrode 48. A contact hole is provided on the source electrode 48 so as to penetrate through the flattening film 50.

The pixel electrode 52 is formed, for example, of a transparent conductive material such as ITO (Indium Tin Oxide), is arranged on the flattening film 50, and is in contact with the source electrode 48 via the contact hole.

The common electrode wiring 54 is formed, for example, of the same transparent conductive material as the gate wiring 40, is arranged on the gate insulating film 38, and is covered by the inter-layer insulating film 44. The inter-layer insulating film 44 is provided with a contact hole up to the common electrode wiring 54. The common electrode relay electrode 56 is formed, for example, of the same material as the drain wiring 46, is arranged on the inter-layer insulating film 44, and is in contact with the common electrode wiring 54 via the contact hole.

The FFS insulating film 58 is formed, for example, of silicon nitride formed at low temperature, and is arranged on the flattening film 50 so as to cover the pixel electrode 52. The flattening film 50 is provided with a contact hole up to the common electrode relay electrode 56, and the FFS insulating film 58 is also provided on the side walls of the contact hole.

The common electrode 60 is formed, for example, of a transparent conductive material such as ITO, is arranged on the FFS insulating film 58, and is in contact with the common electrode relay electrode 56 via the contact hole. The common electrode 60 is provided so as to oppose the pixel electrode 52 via the FFS insulating film 58, and is provided with a plurality of the slits 61 at positions opposing the pixel electrode 52. In the case in which the common electrode 60 is not provided for each pixel, it is not necessary to form the common electrode wiring 54 as long as there is no problem of resistance or the like.

Although not shown, the alignment layer is arranged on the common electrode 60. The alignment layer is a film having a function to cause the liquid crystal molecules to assume the initial alignment, is formed of an organic film such as polyimide, and is rubbed when in use.

In this manner, the common electrode 60 as the upper electrode layer and the pixel electrode 52 as the lower electrode layer are formed on the transmissive substrate 34 as the identical substrate via the FFS insulating film 58 as the insulating layer, the slits 61 are formed on the common electrode 60 as the upper electrode layer, and voltage is applied between the common electrode 60 as the upper electrode layer and the pixel electrode 52 as the lower electrode layer to generate the lateral electric field which is in parallel to the substrate surface, so that the liquid crystal molecules are driven via the alignment layer.

FIG. 6 is an explanatory drawing schematically showing the state of an electric field E applied between the common electrode 60 and the pixel electrode 52. In FIG. 6, the electric field E passing through the slit 61 provided on the common electrode 60 and being directed to the pixel electrode 52 is shown. The direction of the electric field may be directed vise versa, that is, from the pixel electrode 52 to the common electrode 60 through the slit 61.

Figure 7:
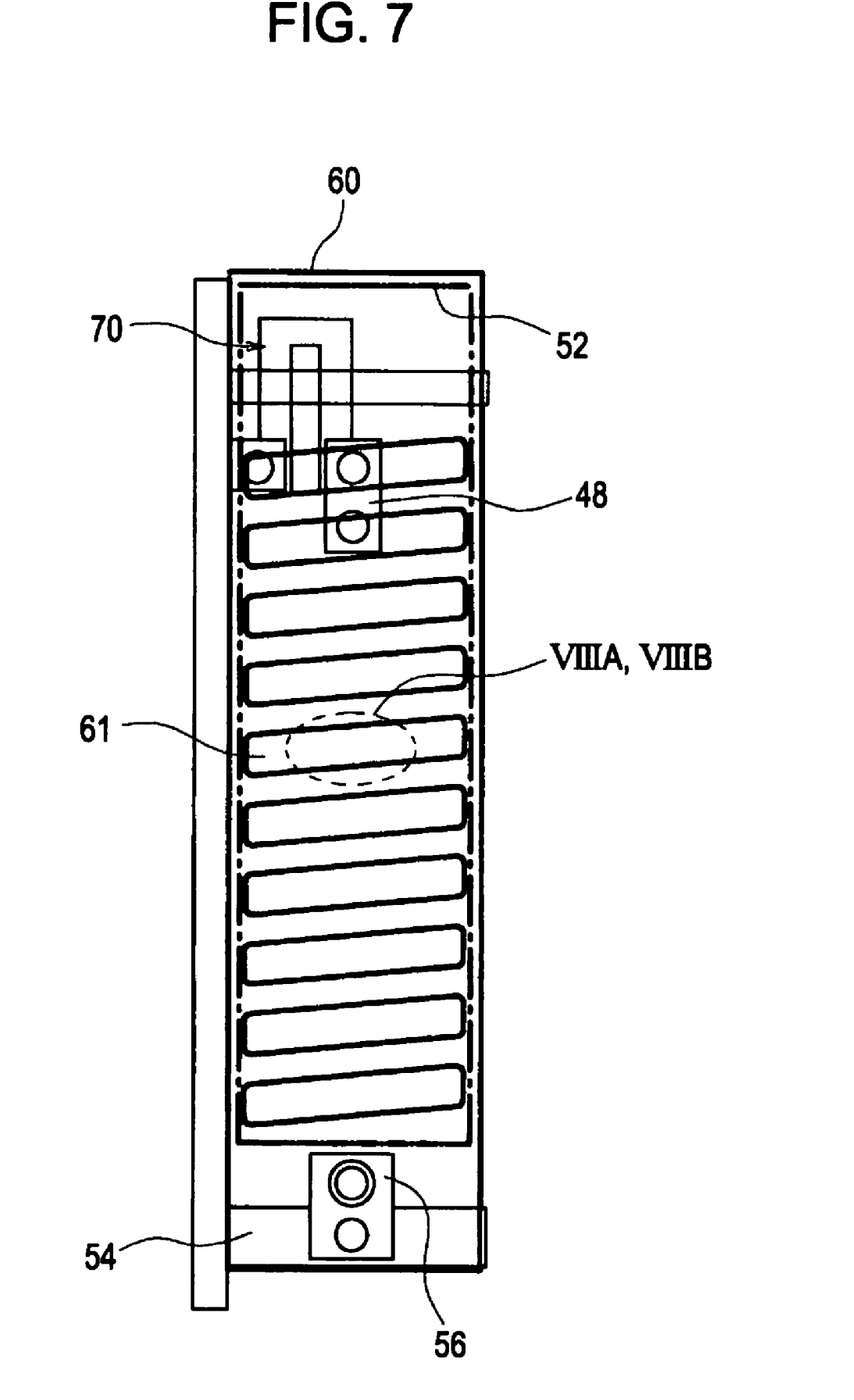
FIG. 7 is a drawing showing one pixel extracted from FIG. 3.

FIG. 7 is a drawing showing one pixel extracted from FIG. 3. Described here again, the pixel electrode 52 is connected to the source electrode 48 of the pixel TFT 70, and is a plate-shaped electrode layer corresponding to one pixel. The common electrode 60 is an electrode layer arranged on the pixel electrode 52 via the FFS insulating film, not shown here, and connected to the common electrode wiring 54 via the common electrode relay electrode 56, and is provided with the plurality of elongated groove-shaped slits 61. The slits 61 are openings for allowing passage of the electric field.

In FIG. 7, the slits 61 are shown to be inclined upward toward the right (counterclockwise inclination), that is, to be inclined slightly upward toward the right with respect to the direction parallel to the direction of extension of the gate wiring 40. This inclination is provided slightly obliquely with respect to the rubbing direction as the alignment process of the alignment layer arranged on the common electrode 60 in order to set the initial arrangement of the liquid crystal molecules. In this case, since the rubbing direction is parallel to the direction of extension of the gate wiring 40, the slits 61 are shown to be inclined slightly with respect to the direction of extension of the gate wiring 40. The direction of inclination of the slits 61 may be different from that shown in FIG. 7 and, for example, the slits 61 may be inclined slightly downward toward the right (clockwise direction) from the direction parallel to the direction of extension of the gate wiring 40.

Figure 8A:
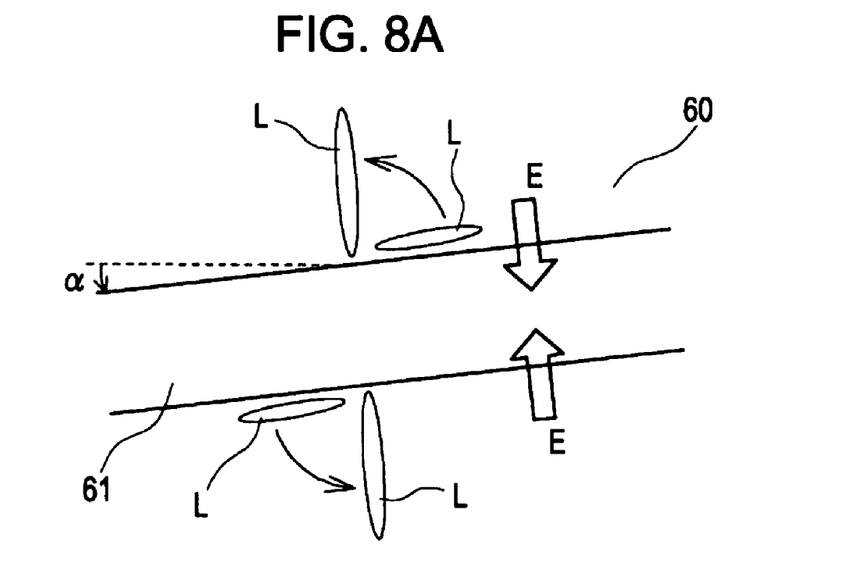
FIGS. 8A and 8B are enlarged drawings of a portion C in FIG. 7 for explaining the direction of the electric field E applied to a slit and a state in which liquid crystal molecules L rotate by the electric field E.
Figure 8B:
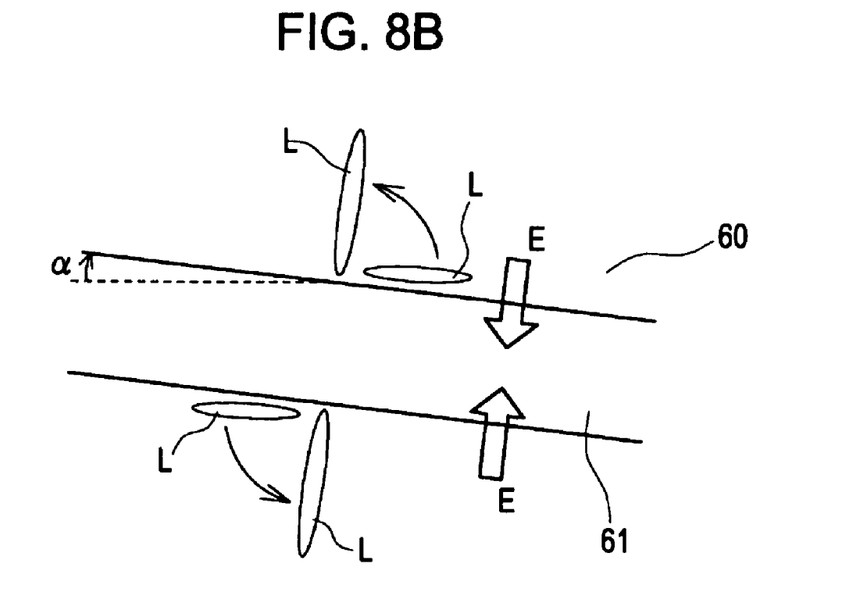

FIGS. 8A and 8B are enlarged drawings of a portion VIIIA, VIIIB in FIG. 7 for explaining the direction of the electric field E applied to the slit 61 and a state in which liquid crystal molecules L rotate by the electric field E. FIG. 8A shows a case in which the slit 61 is inclined upwardly toward the right, and hence is the enlarged drawing of the portion VIIIA in FIG. 7, and FIG. 8B shows a case in which the slit 61 is inclined downward toward the right. Since the electric field E is directed from a conductive portion of the common electrode 60 through the slit 61 as the opening provided on the conductive portion, then through the FFS insulating film to the pixel electrode provided thereunder, the electric field E extends substantially orthogonal to the edge of the slit 61. In other words, as shown in FIGS. 8A and 8B, the electric field E is applied to the edge of the slit 61 in the direction orthogonal to the long side thereof.

When the electric field E is not applied, the liquid crystal molecules L at the edge portion of the slit 61 are aligned substantially parallel to the edge of the slit 61 in the state of initial arrangement. When the electric field E is applied, the liquid crystal molecules L rotate in the direction of the electric field E. In other words, as shown in FIGS. 8A and 8B, the liquid crystal molecules L rotate until they are oriented substantially vertical to the edge of the slit 61. Since the direction of rotation of the liquid crystal molecules L is determined by the anisotropy of dielectric constant or the like, even though the directions of the electric field E are opposite at the both side edges of the slit 61, the directions of rotation of the liquid crystal molecules L at the both side edges of the slit 61 are the same. Even thought the directions of the electric field E applied to the both side edges of the slit 61 are opposite from each other, since the liquid crystal molecules L rotate in the direction toward an acute angle subtended by the direction of the longitudinal axis thereof in the initial alignment and the direction of the electric field E as shown in FIGS. 8A and 8B, if the liquid crystal molecules L rotate counterclockwise at the upper edge of the slit 61, the liquid crystal molecules L rotate also counterclockwise at the lower edge of the slit 61.

Figure 9:
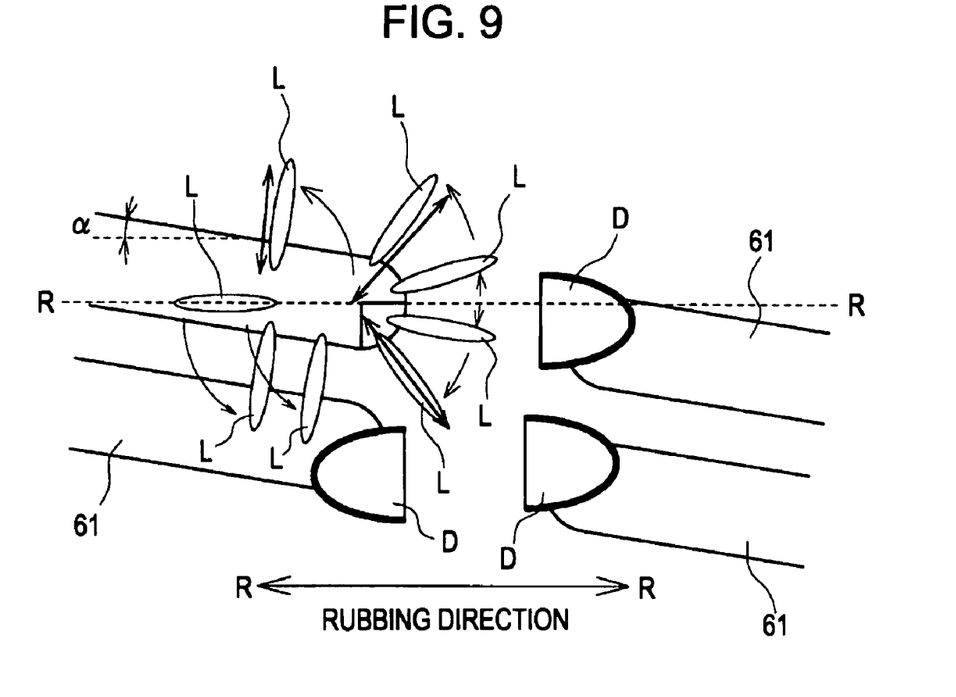
FIG. 9 is an explanatory drawing schematically showing a state in which so-called disclination is generated at edge portions, which correspond to the end portions of the slits in the embodiment shown in FIG. 1.

FIG. 9 is an explanatory drawing schematically showing a state in which so-called disclination is generated at the edge portions, which correspond to the ends of the slits 61. In FIG. 9, the rubbing direction R-R is the left and right direction of the paper plane of the drawing, and a case in which the slits are inclined downward toward the right with respect to the rubbing direction R-R, that is, the case which is described in conjunction with FIG. 8B are shown.

Since the slits 61 are formed by providing an opening on the transparent conductive film which constitutes the common electrode by, for example, the exposure etching technology, the edge portions are somewhat rounded, and hence have an arcuate shape which is similar to a semicircular shape as shown in FIG. 9. Since the electric field is applied orthogonally to the edge of the slit 61 in this arcuate-shaped portion as well, the direction of the electric field changes by 180° along this arcuate shape. For example, when the electric field is applied to the slit 61 shown on the upper left in FIG. 9, the liquid crystal molecules L rotate counterclockwise at the portion of the upper long side of the corresponding slit 61 as described in conjunction with FIGS. 8A and 8B and, in the same manner, the liquid crystal molecules L rotate counterclockwise at the portion of the lower long side of the slit 61. However, in the semicircular arcuate-shaped portion, the liquid crystal molecules L rotate counterclockwise in the upper quarter round arcuate portion, while the liquid crystal molecules L rotate clockwise in the lower quarter round arcuate portion.

In this manner, when an attempt is made to rotate the liquid crystal molecules L in the desired direction by applying the electric field, the liquid crystal molecules L may rotate in the direction opposite from the desired direction or may not rotate in the desired direction in the lower right quarter round arcuate portions at the right edge portions of the slits 61. In other words, when the electric field is applied, the direction of rotation of the liquid crystal molecules may differ depending on the position at the edge portions. The phenomenon that the direction of rotation differs depending on the position in this manner is referred to as disclination. At the boundary between portions in which the liquid crystal molecules rotate in the different directions from each other, since the liquid crystal molecules rotate in the undesired direction, or cannot rotate, the coefficient of transmission may be lowered and hence the boundary lines may be visually recognized. These lines are referred to as "disclination line" or "disclination defect", or may be referred simply as "disclination." In FIG. 9, areas in which disclination occurs are indicated by D.

Referring to FIG. 9, the areas D each correspond to a range extending from a position at which the direction of initial alignment of the liquid crystal molecule L matches the rubbing direction R-R to a position at which the liquid crystal molecule L is rotated clockwise by 90° at the edge of the slit 61. When the electric field is applied, the liquid crystal molecules L rotate clockwise so as to be orthogonal to the edge of the edge portion in this range in FIG. 9, while the liquid crystal molecules L rotate counterclockwise so as to be orthogonal to the edge of the slit 61 in other areas.

In other words, the areas D of the edge portions of the slits 61 at which the disclination occurs each correspond to a range extending from a position at which the direction of the normal of the edge portion of the slit 61 matches the rubbing direction R-R to a position at which the direction of the normal forms an angle of 90° in terms of the clockwise direction.

Figure 10:
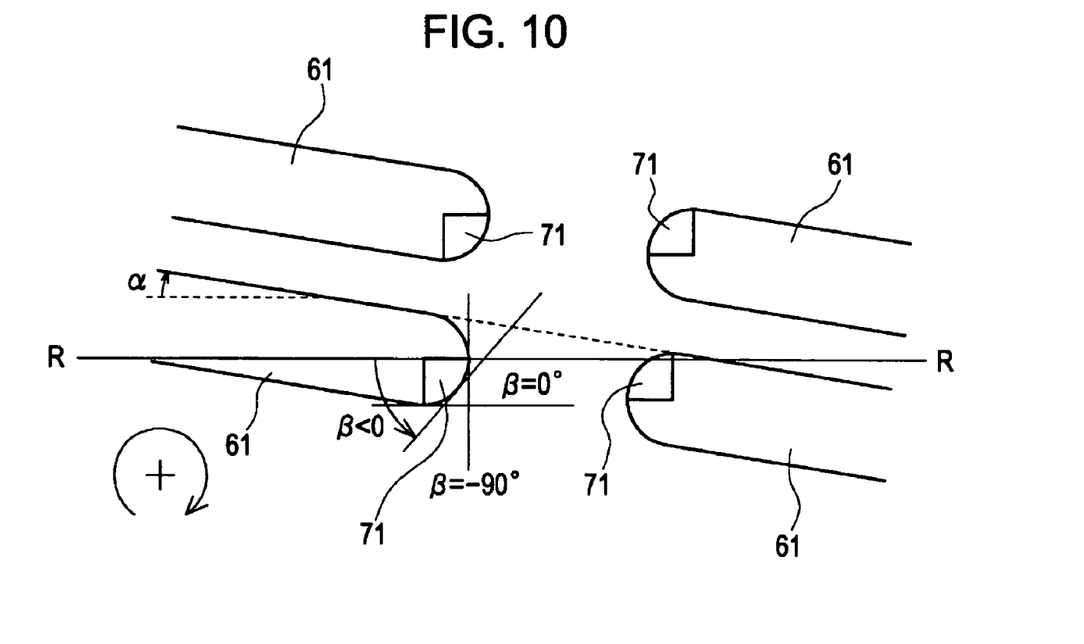
FIG. 10 illustrates areas (D) of the edge portions of the slits where the disclination occurs in the embodiment shown in FIG. 1.

FIG. 10 is a drawing showing areas (D) 71 of the edge portions of the slits 61 where the disclination occurs. In this manner, when the long sides of the slits 61 are inclined clockwise by an angle of $+\alpha$ with respect to the rubbing direction R-R, the areas (D) 71 appear at the lower right portions and the upper left portions of the arcuate shapes at the edge portions of the slits 61. Assuming that the long sides of the slits 61 are inclined clockwise by an angle of $-\alpha$ with respect to the rubbing direction R-R, the areas (D) 71 appear at the upper right portions and the lower left portions in the arcuate shapes at the edge portions of the slits 61. The angle of inclination $\alpha$ may be set to, for example, an angle from approximately 3° to approximately 15°.

When it is indicated by the direction of the normal of the slit 61 as described above, the edge portion of the slit 61 is in the area in which the direction of the normal of the edge portion with respect to the rubbing direction R-R is between 0° and +90°, where the direction toward the acute angle $\alpha$ subtended by the long sides of the slits 61 with respect to the rubbing direction is the positive direction. In FIG. 10, the positive direction of taking an angle is indicated by a circular arrow around a "+" sign. The direction of the circular arrow is the direction toward the acute angle $\alpha$ subtended by the long side of the slit 61 with respect to the rubbing direction R-R as describe above.

In FIG. 10, a case in which the areas (D) 71 are indicated by the tangential direction of the slit 61 is shown. In FIG. 10, a tangential line at an angle $\beta=0°$ and a tangential line at an angle $\beta=-90°$ with respect to the rubbing direction R-R are shown, where the direction toward the acute angle $\alpha$ subtended by the long sides of the slits 61 with respect to the rubbing direction R-R is the positive direction. As shown in FIG. 10, the area (D) 71 corresponds to the area subtended between the tangential line at an angle $\beta=0°$ and the tangential line at an angle $\beta=-90°$ with respect to the rubbing direction R-R.

It is also possible to define the areas (D) 71 from a different point of view. As shown in FIG. 10, assuming that the edge portions of the slits 61 are of a semicircular arcuate shape, when the clockwise rotation with respect to the rubbing direction R-R is an angle in the positive direction, and the direction of extension of the long sides of the slits 61 is inclined clockwise with respect to the rubbing direction, the areas (D) 71 are the partial arcs of the edge portions corresponding to the second quadrant portion and the fourth quadrant portion of a circle. If the direction of extension of the long sides of the slits 61 were to be inclined counterclockwise with respect to the rubbing direction R-R, the areas (D) 71 are the partial arcs of the edge portions corresponding to the first quadrant and the third quadrant of a circle.

The areas (D) 71 of the edge portions of the slits 61 where the disclination occurs may be specified using the direction of the normal or the direction of the tangential line of the edge portions of the slits 61 or using the positions of the quadrants in an arcuate circle at the edge portions by analyzing the direction of rotation of the liquid crystal molecules L at the edge portions of the slits 61 when the electric field is applied as described above. The areas (D) 71 specified above match areas in the liquid crystal display device which are known as areas where the disclination occurs from experience.

From the result described above, the occurrence of disclination or the areas where the disclination occurs may be restrained in the liquid crystal display device. In other words, the electric field in the direction in which the disclination occurs may be blocked from generating, or the areas where such disclination occurs may be reduced in the area (D) 71 specified in the manner described above. To this end, the edge portions of the slits 61 may be formed into a shape which resists the occurrence of the disclination. For example, in the case of the tangential direction of the edge portion, the edge portions of the slits 61 may be formed in such a manner that the angle $\beta$ subtended by the tangential direction with respect to the rubbing direction R-R does not fall within the range from 0° to $-90°$, or the area falling within this range may be reduced as much as possible, where the direction toward the acute angle $\alpha$ subtended by the long sides of the slits 61 with respect to the rubbing direction R-R is the positive direction.

Figure 11:
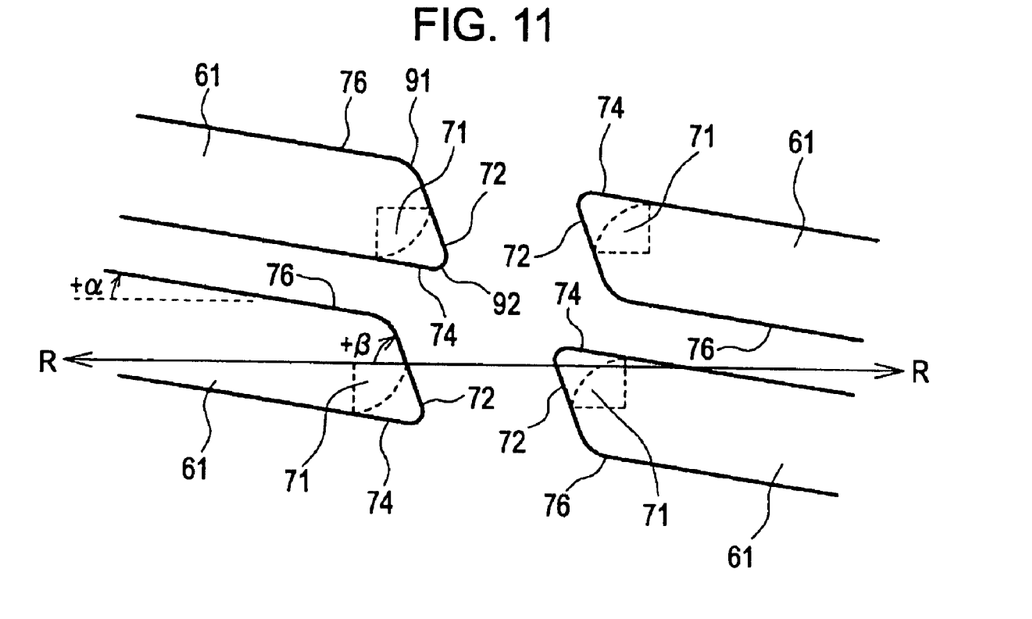
FIG. 11 illustrates an angle β subtended by the tangential direction of the edge portion of the slit in order to restrain the disclination in the embodiment shown in FIG. 1.

FIG. 11 illustrates an example in which the shape of the edge portions of the slits 61 is defined so that the angle $\beta$ subtended by the tangential direction falls within the range from 0° to $+90°$. In this example, the edge portions of the slits 61 are each defined by an inclined end line 72 having the angle of inclination $\beta$ in the range from 0° to $+90°$ with respect to the rubbing direction R-R, a curved portion 91 the tangential direction of which at the edge portion thereof with respect to the rubbing direction R-R falls within the range from 0° and $+90°$, and a curved portion 92 the tangential direction of which at the edge portion thereof with respect to the rubbing direction R-R falls within the range from 0° to $-90°$, where the direction toward the acute angle $\alpha$ subtended by the long sides of the slits 61 with respect to the rubbing direction R-R is the positive direction, and the curved portion 92 the tangential direction of which at the edge portion thereof with respect to the rubbing direction R-R falls within the range from 0° to $-90°$ is smaller than the curved portion 91 in the range from 0° to $+90°$. For example, as shown in the embodiment of FIG. 11, the curved portion 92 forms a substantially acute angle between long side 74 and end line 72, and the curved portion 91 forms a substantially obtuse angle between long side 76 and end line 72. Thus, the angle formed at the curved portion 92 is smaller than that at the curved portion 91. The length of the curved portion 92 is shorter than that of the curved portion 91. The curved portion 92 is smaller than the curved portion 91.

From a different view point, when the direction of extension of long sides 74, 76 of the slit 61 in terms of the rubbing direction R-R is the clockwise inclination with respect to the rubbing direction R-R, the edge portions corresponding to the second quadrant portion and the fourth quadrant portion is defined by the inclined end line 72 having the angle of inclination $\beta$ in the range from 0° to $+90°$ with respect to the rubbing direction R-R, the curved portion the tangential direction of which at the edge portion thereof with respect to the rubbing direction R-R falls within the range from 0° to $+90°$, and the curved portion the tangential direction of which at the edge portion thereof with respect to the rubbing direction R-R falls within the range from 0° to $-90°$, where the direction toward the acute angle α subtended by the long sides of the slits 61 with respect to the rubbing direction R-R is the positive direction, and the curved portion in the range from 0° to −90° is smaller than the curved portion in the range from 0° to +90°.

On the other hand, when the direction of extension of the long sides 74, 76 of the slit 61 is the counterclockwise inclination with respect to the rubbing direction R-R, the edge portions corresponding to the first quadrant portion and the third quadrant portion of the circle is defined by the inclined end line 72 having the angle of inclination β in the range from 0° to +90° with respect to the rubbing direction R-R, the curved portion the tangential direction of which at the edge portion thereof with respect to the rubbing direction R-R falls within the range from 0° to +90°, and the curved portion the tangential direction of which at the edge portion thereof with respect to the rubbing direction R-R falls within the range from 0° to −90°, where the direction toward the acute angle α subtended by the long sides of the slits 61 with respect to the rubbing direction R-R is the positive direction, and the curved portion in the range from 0° to −90° is smaller than the curved portion in the range from 0° to +90°.

Figure 12:
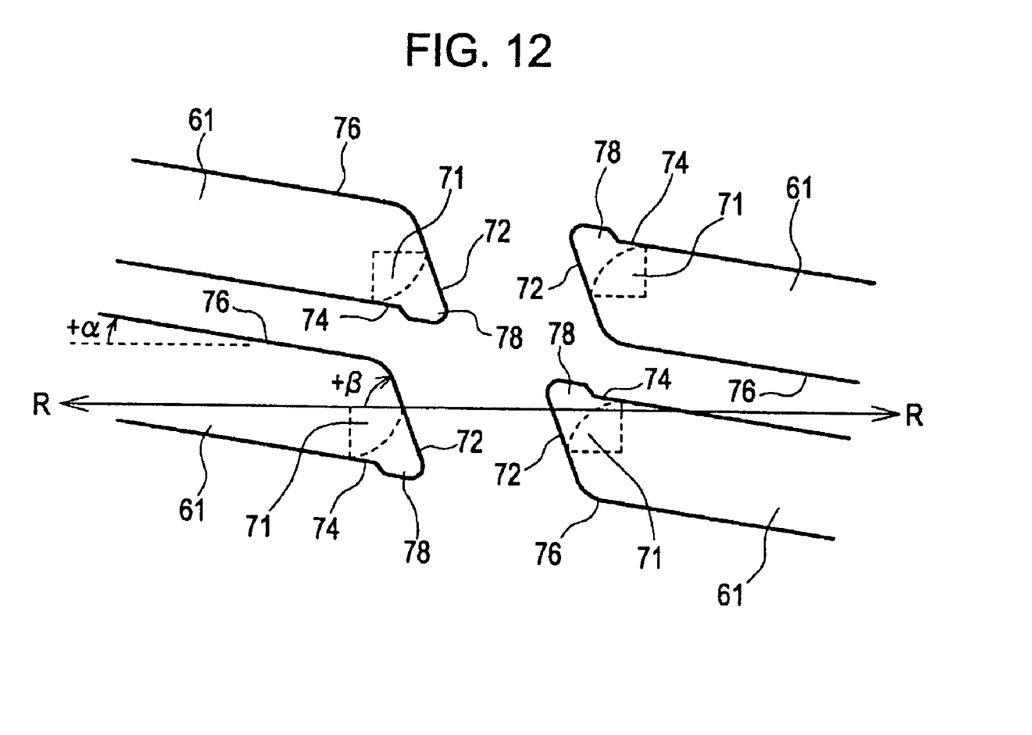
FIG. 12 illustrates a state in which projections are further added to distal ends of the edge portions of the slits in the embodiment shown in FIG. 1.

FIG. 12 shows a configuration in which projections 78 are further added to distal ends of the edge portions each defined by the inclined end line 72, the curved portion the tangential direction of which at the edge portion thereof with respect to the rubbing direction R-R falls within the range from 0° and +90°, and the curved portion the tangential direction of which at the edge portion thereof with respect to the rubbing direction R-R falls within the range from 0° to −90°, which is the configuration shown in FIG. 11. In order to form the edge portions each defined by the inclined end line 72 having an angle of inclination β in the range from 0° to +90° with respect to the rubbing direction R-R, the curved portion the tangential direction of which at the edge portion thereof with respect to the rubbing direction R-R falls within the range from 0° to +90°, and the curved portion the tangential direction of which at the edge portion thereof with respect to the rubbing direction R-R falls within the range from 0° to −90° to be small by patterning actually on the transparent conductive layer, significant ingenuity is required for the pattern of the exposure mask, or the etching process, and so on. Addition of the projecting portion 78 shown in FIG. 12 is a case in which a rectangular or a parallelogram pattern is added to the exposure mask.

In the above description, the rubbing direction R-R is described as the direction of extension of the gate wirings of the pixels. The rubbing direction R-R may have other inclination depending on the usage. In this case as well, the curved portion the tangential direction of which at the edge portion thereof with respect to the rubbing direction R-R falls within the range from 0° to −90° must simply be smaller than the curved portion the tangential direction of which at the edge portion thereof with respect to the rubbing direction R-R falls within the range from 0° to +90, where the direction toward the acute angle α subtended by the long sides of the slits with respect to the rubbing direction R-R is the positive direction.

Figure 13:
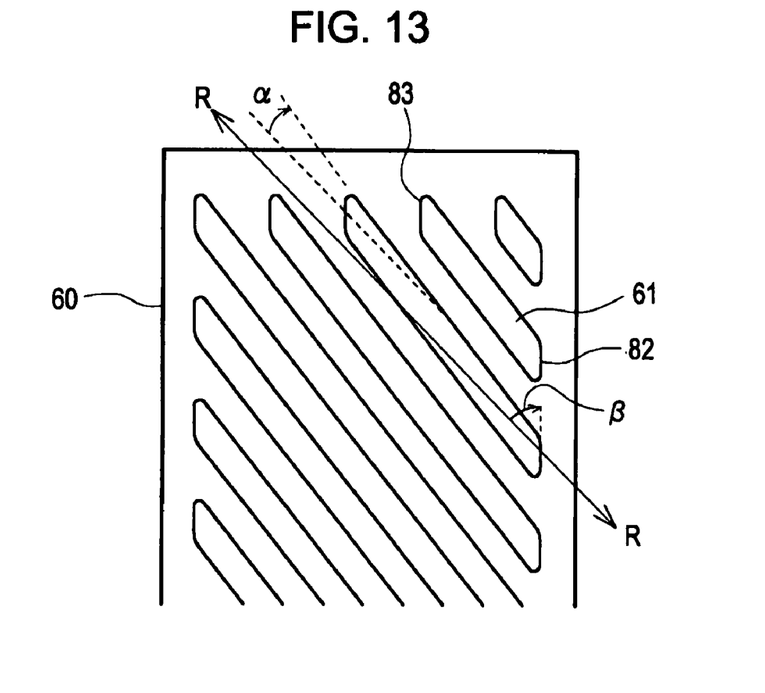
FIG. 13 illustrates a state of the edge portions of the slits, which restrains the disclination in the case of the usage in which a rubbing direction R-R is 45° with respect to the direction of extension of gate wirings of pixels in the embodiment shown in FIG. 1.

FIG. 13 illustrates a state of the edge portions of the slits 61, which restrains the disclination in the case of the usage in which the rubbing direction R-R is 45° with respect to the direction of extension of the gate wirings of the pixels. In this example, the rubbing direction R-R is inclined by 45° with respect to orthogonal two sides which constitute a pixel. In other words, it is inclined by 45° with respect to the direction of extension of the gate wirings of the pixels and, correspondingly, the slits 61 are slightly inclined with respect to the rubbing direction R-R.

In this manner, even when the rubbing direction R-R is not parallel to the direction of extension of the gate wirings of the pixels, the edge portions of the slits 61 are each defined by the curved portion the tangential direction of which at the edge portion thereof with respect to the rubbing direction R-R falls within the range from 0° to +90° and the curved portion the tangential direction of which at the edge portion thereof with respect to the rubbing direction R-R falls within the range from 0° to −90°, where the direction toward the acute angle α subtended by the long sides of the slits 61 with respect to the rubbing direction R-R is the positive direction, and the curved portion in the range from 0° to −90° is formed to be smaller than the curved portion in the range from 0° to +90°. In this arrangement, the occurrence of the disclination is restrained. In addition, the projections described in conjunction with FIG. 12 may further be added to the edge portions.

In the description shown above, the plurality of groove-shaped slits each having an elongated opening for allowing passage of the electric field on the common electrode are arranged separately from each other. When forming the openings which are connected to each other on one side, so-called comb-type or fence-type openings may be employed. In this case as well, the edge portions are formed at distal end portions and proximal end portions of the comb-type or the fence type openings, and the curved portion the tangential direction of which at the edge portion with respect to the rubbing direction R-R falls within a range from 0° to −90° is formed to be smaller than the curved portion between the 0° and +90°, where the direction toward the acute angle subtended by the long sides of the comb-teeth with respect to the rubbing direction R-R is the positive direction. In this configuration, the occurrence of the disclination is restrained even in the case of the comb-type or the fence-type openings.

Figure 14:
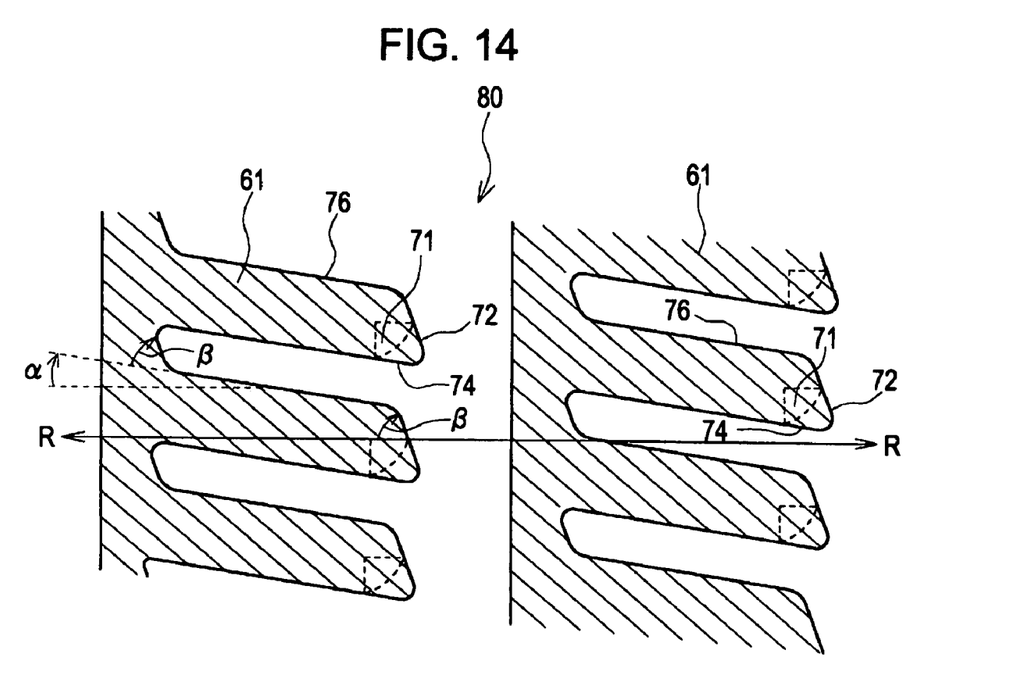
FIG. 14 illustrates the distal end portions and the proximal end portions of the comb-teeth when the common electrode having comb-teeth-shaped openings on the upper electrode layer is employed in the embodiment shown in FIG. 1.

FIG. 14 illustrates the distal end portions and the proximal end portions of the comb-teeth when a common electrode 80 having comb-shaped openings on the upper electrode layer is employed. In this example, the edge portions of the slits 61 are defined by the curved portion the tangential direction of which at the edge portion thereof with respect to the rubbing direction R-R falls within the range from 0° to +90°, and the curved portion the tangential direction of which at the edge portion thereof with respect to the rubbing direction R-R falls within the range from 0° to −90°, where the direction toward the acute angle subtended by the long sides 74, 76 of the comb-teeth with respect to the rubbing direction R-R is the positive direction, and the curved portion the tangential direction of which at the edge portion thereof with respect to the rubbing direction R-R falls within the range from 0° to −90° is formed to be smaller than the curved portion in the range from 0° to +90°. The distal end portions of the comb-teeth are each formed in such a manner that the curved portion the angle of inclination of the tangential direction of which with respect to the rubbing direction R-R falls within the range from 0° to −90° is smaller than the curved portion the angle of inclination of the tangential direction of which falls within the range from 0° to +90°. Also, the proximal end portions of the comb-teeth are each formed in such a manner that the curved portion the tangential direction of which at the edge portion thereof with respect to the rubbing direction R-R falls within the range from 0° to −90° is smaller than the curved portion in the range from 0° to +90°. In this configuration, the occurrence of the disclination is restrained.

What is claimed is:

1. A liquid crystal display device comprising:
   a substrate;
   an upper electrode layer formed on the substrate, the upper electrode layer having slits;

an insulating layer formed between the substrate and the upper electrode layer; and a lower electrode layer formed between the substrate and the insulating layer;

the slits allowing for application of a voltage between the upper electrode layer and the lower electrode layer, the voltage driving liquid crystal molecules, an upper electrode layer and a lower electrode layer formed on a same substrate via an insulating layer, the insulating layer comprising slits formed on the upper electrode layer for applying voltage between the upper electrode layer and the lower electrode layer and for driving liquid crystal molecules, edge portions of the slits each including a first curved portion the tangential direction of which at the edge portions with respect to a rubbing direction falls within a range from 0° to +90° and a second curved portion the tangential direction of which at the edge portions with respect to the rubbing direction falls within the range from 0° to −90°, where the direction toward an acute angle subtended by the long sides of the slits with respect to the rubbing direction is the positive direction, the second curved portion being smaller than the first curved portion, wherein the second curved portion includes a projecting portion, the projecting portion being located at a distal end of the second curved portion.

2. The liquid crystal display device according to claim 1, the edge portion of the slit further including an inclined end line having an angle of inclination between $\alpha$ and +90° with respect to the rubbing direction, where $\alpha$ is an acute angle subtended by the long sides of the slits with respect to the rubbing direction and the direction toward the acute angle is the positive direction.

3. The liquid crystal display device according to claim 2, the edge portion of the slit further including a projection at the distal end thereof.

4. The liquid crystal display device according to claim 1, the rubbing direction with respect to the direction of axes of the rectangular shape of the pixel orthogonal to each other being at an angle of 45°.

5. The liquid crystal display device according to claim 1, the upper electrode being a pixel electrode.

6. The liquid crystal display device according to claim 1, the upper electrode being a common electrode.

7. A liquid crystal display device comprising:
a substrate;
an upper electrode layer formed on the substrate, the upper electrode layer having openings;
an insulating layer formed between the substrate and the upper electrode layer; and
a lower electrode layer formed between the substrate and the insulating layer,
the openings having a comb-teeth shape including a plurality of comb teeth connected to each other on one side, the openings allowing for application of a voltage between the upper electrode layer and the lower electrode layer, the voltage driving liquid crystal molecules,
an upper electrode layer and a lower electrode layer formed on a same substrate and connected to each other on one side of the substrate via an insulating layer,
the insulating layer comprising openings in a comb-teeth shape on the upper electrode layer for applying voltage between the upper electrode layer and the lower electrode layer and for driving liquid crystal molecules,
edge portions of comb-teeth each including a first curved portion the tangential direction of which at the edge portion of comb teeth of the comb-teeth shape with respect to a rubbing direction falls within a range from 0° to +90° and a second curved portion the tangential direction of which at the edge portions of the comb-teeth with respect to the rubbing direction falls within a range from 0° to −90°, where the direction toward an acute angle subtended by the long sides of the comb-teeth with respect to the rubbing direction is the positive direction, the second curved portion being smaller than the first curved portion, wherein the second curved portion includes a projecting portion, the projecting portion being located at a distal end of the second curved portion.

8. The liquid crystal display device according to claim 7, the edge portion of the comb-teeth further including an inclined end line having an angle of inclination between $\alpha$ and +90° with respect to the rubbing direction, where $\alpha$ is an acute angle subtended by the long sides of the comb-teeth with respect to the rubbing direction and the direction toward the acute angle is the positive direction.

9. The liquid crystal display device according to claim 8, the edge portion of the comb-tooth further including a projection at the distal end thereof.

10. The liquid crystal display device according to claim 7, the rubbing direction with respect to directions of axes of the rectangular shape of the pixel orthogonal to each other being at an angle of 45°.

11. The liquid crystal display device according to claim 7, the edge portion of the comb-tooth being the distal end portion or the proximal end portion of the comb-tooth.

12. The liquid crystal display device according to claim 7, the upper electrode being a pixel electrode.

13. The liquid crystal display device according to claim 7, the upper electrode being a common electrode.

14. A liquid crystal display device, comprising:
a substrate;
an upper electrode layer formed on the substrate, the upper electrode layer having slits;
an insulating layer formed between the substrate and the upper electrode layer; and
a lower electrode layer formed between the substrate and the insulating layer,
the slits having a comb-teeth shape including a plurality of comb teeth, the slits allowing for application of a voltage between the upper electrode layer and the lower electrode layer, the voltage driving liquid crystal molecules,
each comb tooth of the plurality of comb teeth having long sides, short sides, and edge portions at the short sides,
each edge portion including a first curved portion having a first tangential direction and a second curved portion having a second tangential direction,
when a direction toward an acute angle subtended by the long sides with respect to a rubbing direction is defined to be positive, the first tangential direction falls within a range from 0° to +90° with respect to the rubbing direction, and the second tangential direction falls with a range from 0° to −90° with respect to the rubbing direction; and
the first curved portion forming a first angle that is larger than a second angle formed at the second curved portion, wherein the second curved portion includes a projecting portion, the projecting portion being located at a distal end of the second curved portion.

15. The liquid crystal device according to claim 14, the first angle being an obtuse angle, and the second angle being an acute angle.

* * * * *